(12) United States Patent
Ben-Tzur (10) Patent No.: US 10,146,880 B2
(45) Date of Patent: Dec. 4, 2018

(54) DETERMINING A FILTERING PARAMETER FOR VALUES DISPLAYED IN AN APPLICATION CARD BASED ON A USER HISTORY

(71) Applicant: Samsung Electronics Co., Ltd., Suwon-si, Gyeonggi-do (KR)

(72) Inventor: Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 14/970,504

(22) Filed: Dec. 15, 2015

(65) Prior Publication Data

US 2017/0169030 A1    Jun. 15, 2017

(51) Int. Cl.
*G06F 17/30* (2006.01)
(52) U.S. Cl.
CPC .............................. *G06F 17/30867* (2013.01)
(58) Field of Classification Search
CPC ......... G06F 17/30554; G06F 17/30867; G06F 17/30876
USPC ....................................................... 707/733
See application file for complete search history.

(56) References Cited

U.S. PATENT DOCUMENTS

| 2010/0042846 | A1* | 2/2010 | Trotter | G06F 21/31 713/182 |
| 2011/0034176 | A1* | 2/2011 | Lord | G06F 17/30244 455/450 |
| 2011/0161076 | A1* | 6/2011 | Davis | G06F 3/04842 704/231 |
| 2011/0258049 | A1* | 10/2011 | Ramer | G06F 17/30867 705/14.66 |
| 2013/0018982 | A1* | 1/2013 | McConnell | G06F 17/30702 709/217 |
| 2013/0031599 | A1* | 1/2013 | Luna | G06F 21/554 726/1 |
| 2013/0346545 | A1* | 12/2013 | Petersen | H04L 67/10 709/217 |
| 2014/0080428 | A1* | 3/2014 | Rhoads | G06F 17/30241 455/88 |

* cited by examiner

*Primary Examiner* — Hosain T Alam
(74) *Attorney, Agent, or Firm* — Jefferson IP Law, LLP (57) ABSTRACT

A card server that provides a card object to a mobile computing device in response to receiving a card request from the mobile computing device. The mobile computing device can utilize the card object to display an application card at the mobile computing device. The application card may include one or more multi-value data fields. A multi-value data field refers to a data field with multiple values. A multi-value data field may include a collapsed view, and an expanded view. The card object may specify a collapsed-view descriptor that can be displayed in the collapsed view. The card object may specify the values of the multi-value data field. Additionally, the card object may specify a filtering parameter that can be utilized to filter the values in the expanded view.

19 Claims, 4 Drawing Sheets

DETERMINING A FILTERING PARAMETER FOR VALUES DISPLAYED IN AN APPLICATION CARD BASED ON A USER HISTORY

TECHNICAL FIELD

This disclosure relates to determining a filtering parameter for values that are displayed in an application card based on a user history.

BACKGROUND

Many mobile computing devices can display a graphical user interface that allows a user of the mobile computing device to enter a search query. Upon receiving the search query from the user, the mobile computing device can transmit the search query to a search server. The search server can generate search results based on the search query. Upon generating the search results, the search server can send the search results to the mobile computing device. The mobile computing device receives the search results, and can display the search results on a display of the mobile computing device. Some mobile computing devices can display the search results in the form of a card. The card may include various data fields. Some data fields may include multiple values. Such data fields may be referred to as multi-value data fields. For example, a data field that displays the cast of a movie may include the names of several actors that were casted in the movie. Some multi-value data fields may include a vast number of values. Due to the limited amount of real estate for displaying information, there may be a need to determine which values are to be displayed.

SUMMARY

One aspect of the disclosure provides a card server. The card server may include a network communication device, a storage device, and a processing device. The storage device may store a user history data store, and a card data store. The user history data store may store user history records. Each user history record may be associated with a user identifier (ID). Each user history record may include a browsing history and/or a search history. The card data store may store card records. Each card record may include one or more multi-value data fields. Each multi-value data field may include a text string that represents a collapsed-view descriptor, and expanded-view information. The expanded-view information may include a plurality of values, and a plurality of filtering parameters for filtering the values.

The processing device may execute computer-readable instructions that, when executed by the processing device, cause the processing device to receive a card request from a mobile computing device. The card request may include a search query with one or more search terms, and a user ID. The card server can identify a set of card records from the card data store based on the search terms in the search query. The card server can determine a relevance score for each card record in the set of card records. The relevance score for a card record may indicate the relevance of the card record to the search query. The card server can select a card record from the set of card records based on the relevance scores of the card records. The card server identifies a user history record associated with the card request based on the user ID specified in the card request.

For each multi-value field in the selected card record, the card server can select a current filtering parameter from the plurality of filtering parameters. The card server may select the current filtering parameter based on the browsing history and/or the search history indicated by the user history record associated with the card request. The card server can generate a card object that comprises the one or more multi-value data fields from the selected card record. The card object can indicate the selected filtering parameter for the values in the multi-value data field. The card server transmits the card object to the mobile computing device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure provides a system that may be used to render an application card at a mobile computing device based on a search query initiated by the mobile computing device. The application card may include various data fields. The data fields may include one or more values. A data field that includes a single value may be referred to as a single-value data field, whereas a data field that includes multiple values may be referred to as a multi-value data field. Each value may be associated with one or more filtering parameters. A value may be displayed in the application card, if the filtering parameter associated with the value is applied.

The system may include a card server that receives card requests from various mobile computing devices. A card request may include a search query. Upon receiving a card request from a mobile computing device, the card server can identify a card record that can be used to render the application card. If the card record includes multi-value data fields, then the card server can automatically determine a filtering parameter for the values of the multi-value data field. Determining the filtering parameter may include selecting the filtering parameter from a set of filtering parameters. Values that are associated with the selected filtering parameter may be displayed, and values that are not associated with the selected filtering parameter may not be displayed. The card server may determine the filtering parameter based on a user history associated with the card request. The user history may include a browsing history, a search history, and/or a card history.

Figure 1:
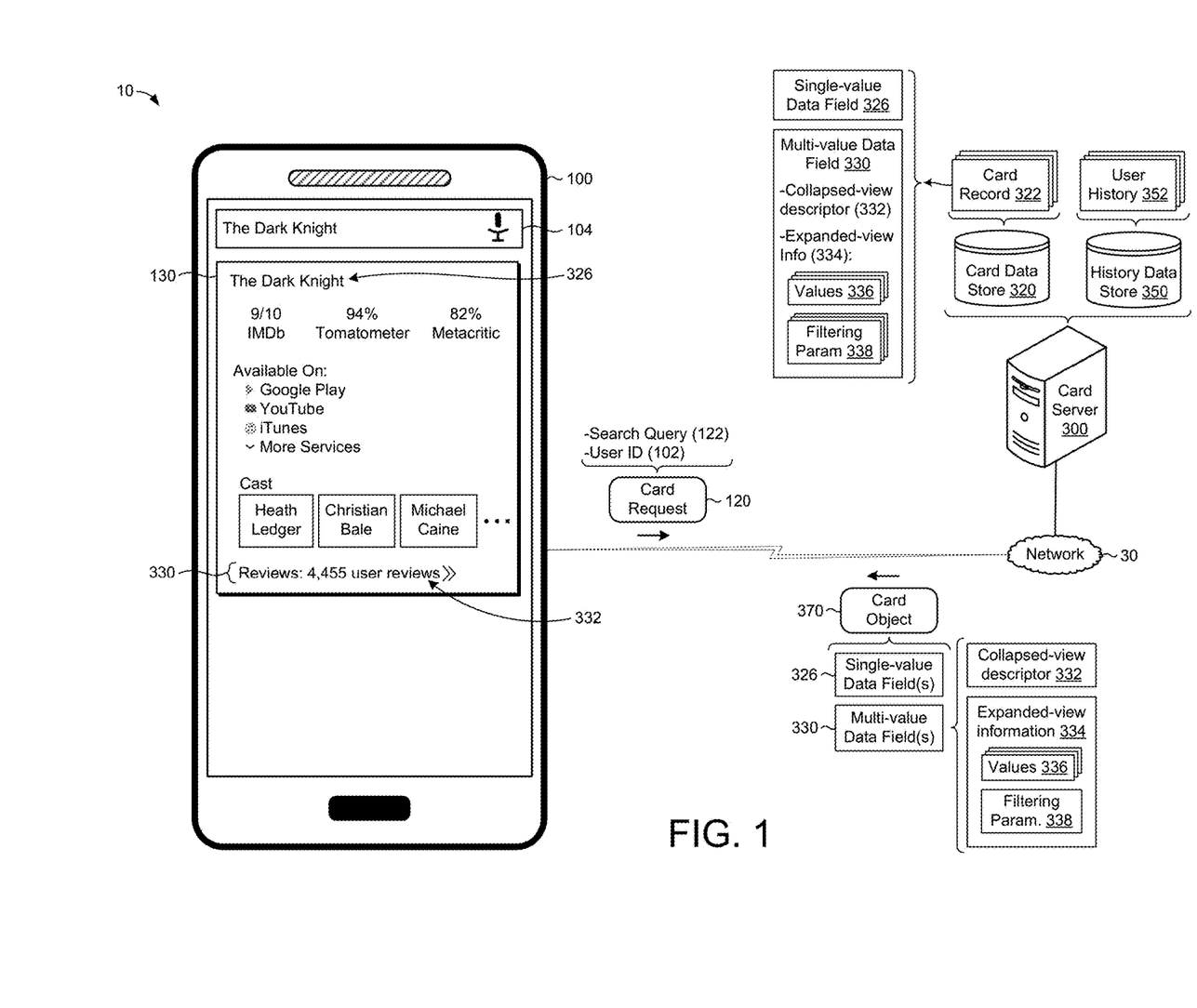
FIG. 1 is a schematic diagram of a system that determines a filtering parameter for values in a multi-value data field of an application card.

FIG. 1 illustrates a schematic diagram of a system 10 that provides application cards 130 to a mobile computing device 100. The system 10 may include the mobile computing device 100, and a card server 300. The mobile computing device 100, and the card server 300 can communicate via a network 30. The network 30 may include a wireless network (e.g., a cellular network), or a wired network. In operation, the mobile computing device 100 can transmit (e.g., send) a card request 120 to the card server 300. The card request 120 can include a search query 122, and a user identifier (ID) 102 that identifies a user of the mobile computing device 100. In response to transmitting the card request 120, the mobile computing device 100 receives a card object 370 from the card server 300. The card object 370 may include information that the mobile computing device 100 can utilize to render the application card 130.

The card server 300 may include a card data store 320, and a user history data store 350 (history data store 350, hereinafter). The card data store 320 stores various card records 322. Each card record 322 may include a single-value data field 326, and a multi-value data field 330. The multi-value data field 330 may include a text string that represents a collapsed-view descriptor 332. The collapsed-view descriptor 332 can be displayed in a collapsed view of the multi-value data field 330. The multi-value data field 330 may also include expanded-view information 334 that can be displayed in an expanded view of the multi-value data field 330. The expanded-view information 334 may include values 336, and filtering parameters 338 that can be used to filter the values 336. The history data store 350 may store user history records 352. Each history record 352 may store a user history for a user. For example, a history record 352 may store a browsing history, a search history, and/or a card history.

As described herein, a collapsed view of a multi-value data field 330 refers to a view that can display a brief generalization of the values 336 in the multi-value data field 330. For example, the collapsed view may indicate the number of values 336. In some implementations, the collapsed view may include a summary of the values 336. For example, if the values 336 include reviews for a movie, then the collapsed view may indicate whether the reviews are generally positive or negative. An expanded view of multi-value data field 330 may refer to a view that can display specific values 336 of the multi-value data field 330. The expanded view may display (e.g., may only display) values 336 that are associated (e.g., tagged) with a filtering parameter 338.

In the example of FIG. 1, the application card 130 is for The Dark Knight movie. In this example, the application card 130 includes a single-value data field 326 that displays a movie title. The application card 130 also includes a multi-value data fields 330 for user reviews. In the example of FIG. 1, the application card 130 is displaying a collapsed view for the user reviews field. In its collapsed view, the user reviews field displays the collapsed-view descriptor 332. The mobile computing device 100 can detect a user input to expand the user reviews field. Upon detecting the user input to expand the user reviews field, the mobile computing device 100 can display an expanded view for the user reviews field. In its expanded view, the user reviews field can display the values 336 based on the filtering parameter 338 specified in the card object 370. See FIGS. 2A-2B for example depictions of the expanded view for the user reviews field.

The card server 300 selects a filtering parameter 338 for the values 336 based on information stored in a user history record 352 associated with the card request 120. The mobile computing device 100 can utilize the selected filtering parameter 338 to display a subset of the values 336. Specifically, the mobile computing device 100 can display the values 336 that are associated with the selected filtering parameter 338, and omit the values 336 that are not associated with the selected filtering parameter 338. In other words, some of the values 336 may get filtered out based on the selected filtering parameter 338. Values 336 that get filtered out may not be displayed in the expanded view of the multi-value data field when the mobile computing device 100 applies the selected filtering parameter 338.

The card server 300 can select the filtering parameter 338 from a set of filtering parameters 338 stored in the card record 322. The card server 300 may select the filtering parameter 338 based on information stored in a user history record 352 associated with the card request 120. In some implementations, the card server 300 can select the filtering parameter 338 based on a browsing history stored in the user history record 352. In some examples, the browsing history may include a web browsing history. In such examples, the card server 300 can select the filtering parameter based on form data associated with a web page indicated by the browsing history. In some implementations, the card server 300 can select the filtering parameter 338 based on a search history stored in the user history record 352. For example, the card server 300 can select a particular filtering parameter 338, if that particular filtering parameter 338 is mentioned in a threshold number of previous search queries. In some implementations, the card server 300 can select the filtering parameter 338 based on a card record history stored in the user history record 352. The card record history may indicate filtering parameters 338 that were previously selected at the mobile computing device 100 by a user. The card server 300 may select the filtering parameter 338 based on the previously selected filtering parameters 338.

Figure 2A:
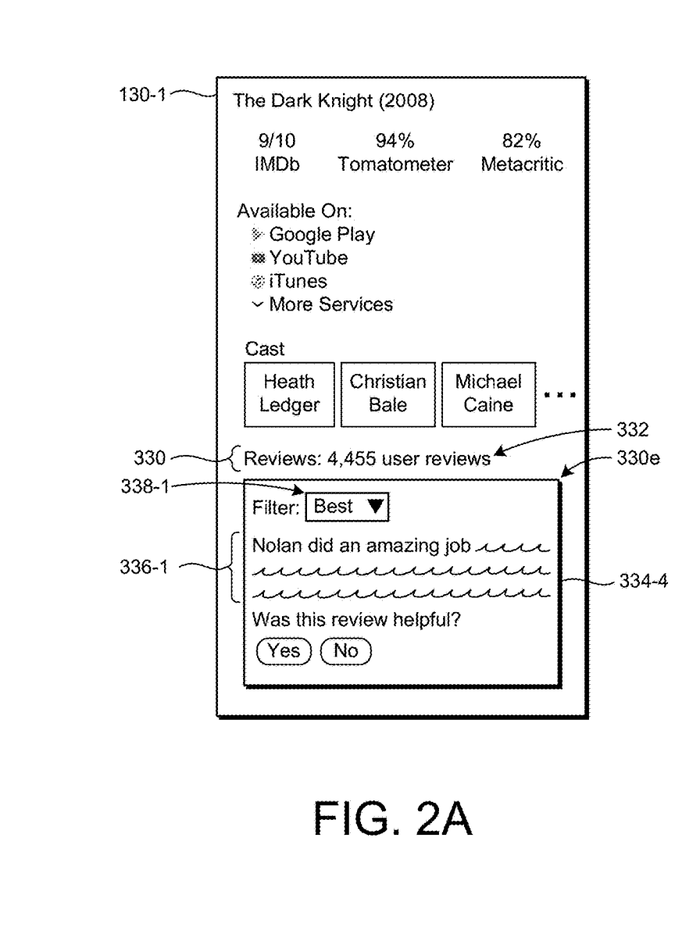
FIGS. 2A-2B are diagrams of application cards in which the values of a multi-value data field are displayed based on a filtering parameter that is determined automatically.
Figure 2B:
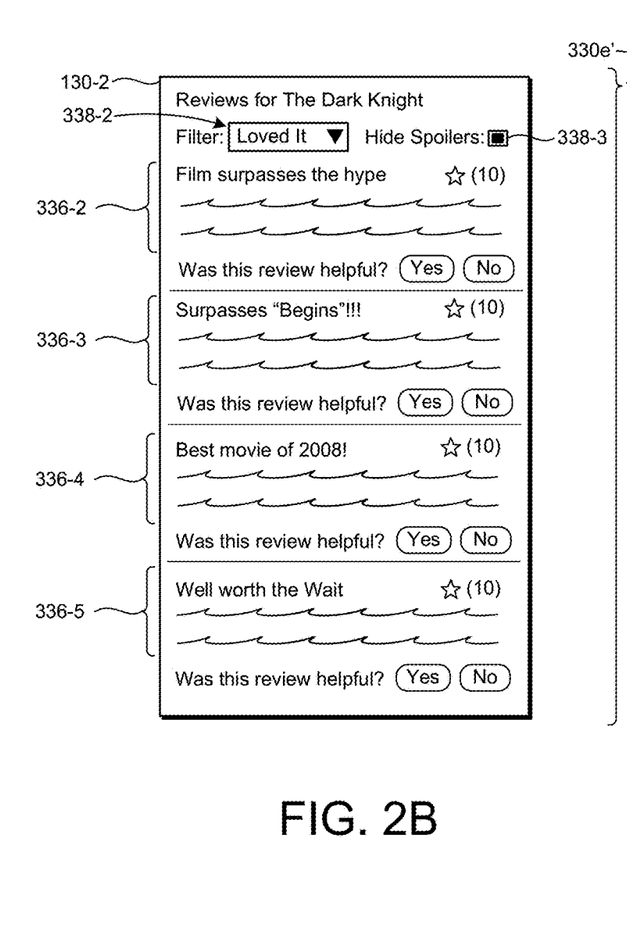

FIGS. 2A-2B show example application cards 130-1, 130-2 in which the filtering parameter 338 for the multi-value data field 330 has been automatically determined. The mobile computing device 100 displays an expanded view 330e of the multi-value data field 330 upon detecting a user input to display the expanded view 330e. Detecting the user input to display the expanded view 330e may include detecting a user selection of the collapsed-view descriptor 332. In FIG. 2A, the mobile computing device 100 displays the expanded view 330e of the multi-value data field 330 within the application card 130-1. For example, the mobile computing device 100 may display the expanded view 330e below the collapsed-view descriptor 332. Alternatively, the mobile computing device 100 may remove the collapsed-view descriptor 332 when the mobile computing device 100 is displaying the expanded view 330e. In FIG. 2B, the mobile computing device 100 displays the expanded view 330e' as a separate application card 130-2.

As illustrated in FIGS. 2A-2B, the expanded view 330e displays the values 336. For example, the expanded view 330e shown in FIG. 2A displays one value 336-1, and the expanded view 330e' shown in FIG. 2B displays four values 336-2, . . . 336-5. The expanded view 330e displays the values 336 based on the selected filtering parameter 338. Specifically, the expanded view 330e may only display values 336 that are associated with the selected filtering parameter 338. For example, the expanded view 330e in FIG. 2A displays the first value 336-1 because the first value 336-1 is associated with the first filtering parameter 338-1. Specifically, the first value 336-1 may be tagged as being among the "best" values 336. For example, the first value 336-1 may include a review that has been tagged as being among the "best" reviews because a threshold number of users indicated that the review was helpful.

In the example of FIG. 2B, the expanded view 330e' displays the values 336-2, . . . 336-5 based on the second filtering parameter 338-2. The values 336-2, . . . 336-5 may be reviews that may have been tagged as reviews which indicate that the reviewers loved the movie. For example, a review may be tagged as "loved it", if the reviewer provided a rating that is greater than a particular rating threshold (e.g., more than 9 stars, for example, 10 stars). As exemplified, all four reviews have a '10 star' rating. The expanded view 330e' can display the values 336 based on an additional third filtering parameters 338-3. In this example, the expanded view 330e' may only display reviews that have been tagged as "loved it" (e.g., have a rating of more than 9 stars), and do not include spoilers. Reviewers may indicate whether their reviews include spoilers.

Figure 3:
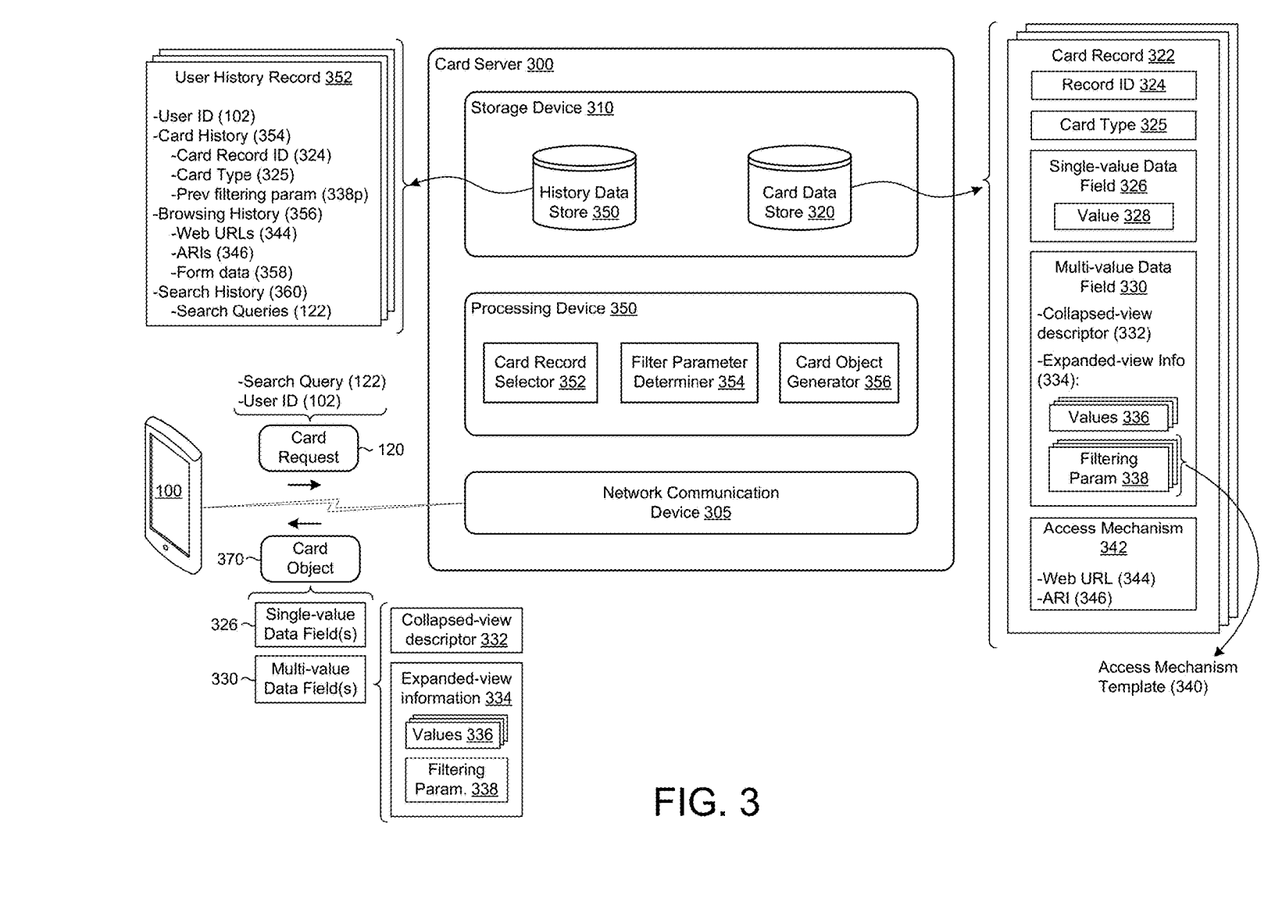
FIG. 3 is a block diagram of a card server that determines the filtering parameter for values in a multi-value data field based on a user history associated with the mobile computing device.

FIG. 3 illustrates an example block diagram for the card server 300. The card server 300 may include a network communication device 305, a storage device 310, and a processing device 350. The card server 300 may be implemented by a cloud computing platform. The cloud computing platform may include a collection of remote computing services. The cloud computing platform may include computing resources (e.g., the processing device 350). The computing resources may include physical servers that have physical central processing units (pCPUs). The cloud computing resources may include storage resources (e.g., the storage device 310). The storage resources may include database servers that support NoSQL, MySQL, Oracle, SQL Server, or the like. The cloud computing platform may include networking resources (e.g., the network communication device 305). Example cloud computing platforms include Amazon Web Services®, Google Cloud Platform®, Microsoft AZURE™ and Alibaba Aliyun™.

The network communication device 305 communicates with a network (e.g., the network 30 shown in FIG. 1). The network communication device 305 may include a communication interface that performs wired communication (e.g., via Ethernet, Universal Serial Bus (USB) or fiber-optic cables). The network communication device 305 may perform wireless communication (e.g., via Wi-Fi, Bluetooth, Bluetooth Low Energy (BLE), Near Field Communications (NFC), ZigBee, a cellular network, or satellites). The network communication device 305 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE), or LTE-Advanced). The transceiver may operate in accordance with a Universal Serial Bus (USB) specification (e.g., via a USB port).

The storage device 310 stores data. The storage device 310 may include one or more computer readable storage mediums. For example, the storage device 310 may include solid state memory devices, hard disk memory devices, optical disk drives, read-only memory, and/or nanotube-based storage devices. The storage device 310 may be connected to the processing device 350 via a bus, and/or a network. Different storage mediums within the storage device 310 may be located at the same physical location (e.g., in the same data center, same rack, or same housing). Different storage mediums of the storage device 310 may be distributed (e.g., in different data centers, different racks, or different housings). The storage device 310 may store a card data store 320, and a user history data store 350.

The card data store 320 stores card records 322. The card records 322 store information that can be utilized to display the application cards 130 at the mobile computing device 100. Each card record 322 may include a card record ID 324. The card record ID 324 may include a string that identifies the card record 322. A card record 322 may include a card type 325. The card type 325 may include the type of information that the card record 322 stores. For example, the card type 325 may indicate that the card record 322 stores information for a movie card that displays information regarding a movie. Similarly, the card type 325 may indicate that the card record 322 stores information for a product card that displays information regarding a product. A card record 322 may include one or more single-value data fields 326. A single-value data field 326 stores a single value 328. A card record 322 may store one or more multi-value data fields 330. A multi-value data field 330 stores multiple values 336. The multi-value data field 330 may be displayed in a collapsed view, or an expanded view. In the collapsed view, the multi-value data field 330 may display a collapsed-view descriptor 332. The collapsed-view descriptor 332 may include a text string. The collapsed-view descriptor 332 may also include a user-selectable link that can be selected to display the expanded view of the multi-value data field 330.

A card record 322 may include expanded-view information 334. The expanded-view information 334 may include the values 336, and a set of filtering parameters 338. A value 336 may be associated (e.g., tagged) with one or more filtering parameters 338. Values 336 that are associated with a particular filtering parameter 338 are displayed in the expanded view of the multi-value data field 330 when the card server 300 selects that particular filtering parameter 338. In other words, a filtering parameter 338 can be utilized to display the values 336 that are associated with the filtering parameter 338, and to filter out values 336 that are not associated with the filtering parameter 338.

The card records 322 may correspond with application states of various applications. For example, the card records 322 may correspond with application states of native applications that can be installed at mobile computing devices 100. The card records 322 may correspond with application states of web applications (e.g., with webpages of a website). The data fields of a card record 322 may store information that the corresponding application state displays. For example, if a card record 322 corresponds with an application state that displays information about The Dark Knight movie, then the card record 322 may include single-value data fields 326 for the movie title, the release year, etc. In this example, the card record 322 may include multi-value data fields 330 for the actors in the movie, the ratings for the movie, the reviews for the movie, etc.

In the example where a multi-value data field 330 is for reviews, the values 336 may include the reviews. Table 1 shows example filtering parameters 338 for the reviews.

| Filtering parameter | Reviews associated with the filtering parameter |
|---|---|
| "Best" | Displays reviews that the users indicated were most useful. |
| "Loved it" | Displays reviews for which the reviewer assigned a rating that is greater than a threshold (e.g., 9 stars). |
| "Hated it" | Displays reviews for which the reviewers assigned a rating that is less than a threshold (e.g., 9 stars). |
| "Chronological" | Displays reviews based on a time at which the reviews were submitted (e.g., latest reviews are displayed first, or the oldest reviews are displayed first). |

-continued

| Filtering parameter | Reviews associated with the filtering parameter |
|---|---|
| "Prolific Authors" | Displays reviews that were authored by reviewers who have authored more than a threshold number of reviews (e.g., more than 100). |

A card record 322 may also store an access mechanism 342. The access mechanism 342 may be used to access an application. The access mechanism 342 can provide access to a native application that may be installed at the mobile computing device 100. Alternatively or additionally, the access mechanism 342 may provide access to a web application. The access mechanism 342 may include a uniform resource identifier (URI) that identifies a resource, and provides access to the resource. The access mechanism 342 may include an application resource identifier (ARI) 346 that identifies a resource (e.g., an application state) with an application, and provides access to the resource. The access mechanism 342 may include a link. For example, the access mechanism 342 may include a web uniform resource locator (URL) 344 that links to a webpage, or an application URL that links to an application state.

In some implementations, the filtering parameters 338 may be a part of an access mechanism template 340. The card server 300 can select a filtering parameter 338, and indicate the selected filtering parameter 338 by populating (e.g., parameterizing) the access mechanism template 340 with the selected filtering parameter 338. Upon being parameterized, the access mechanism template 340 may resemble the access mechanism 342. The access mechanism template 340 may be referred to as a URI template, or a URL template. In addition to being parameterized with the selected filtering parameter 338, the access mechanism template 340 may be parameterized with the values 336 that are associated with the selected filtering parameter 338.

The user history data store 350 stores user history records 352 that correspond with user histories of various users. A user history record 352 may include a user ID 102 that identifies a user. The user ID 102 may include an email address, a user name, a telephone number (e.g., a cell number), etc. A user history record 352 may include a card history 354, a browsing history 356, and/or a search history 360. The user history record 352 may include other historical information regarding the user. For example, the user history record 352 may store certain user preferences that the user may have specified.

The card history 354 may indicate the application cards 130 that the user has been served. For example, the card history 354 may include the card record IDs 324 that were utilized to provide the application cards 130 to the user. The card history 354 may also indicate the filtering parameters 338 that the user previously selected when the user was presented an application card 130 based on a card record 322 identified by a particular card record ID 324. In other words, a card record ID 324 in the card history 354 may be associated with one or more filtering parameters 338 that were previously selected by the user. Alternatively or additionally, the card history 354 may include the card types 325 that the card server 300 previously served the user. For example, the card history 354 may indicate that the card server 300 previously served the user with a movie card, a product card, etc. The card history 354 may also indicate the filtering parameters 338 that the user previously selected when the user was presented a particular card type 325. For example, the card history 354 may indicate that when the user is presented with a movie card, the user first selects the "loved it" filtering parameter for the reviews, and then the "hated it" filtering parameter for the reviews. In another example, the card history 354 may indicate that the user selects the "Prolific Authors" filtering parameter for the reviews field 80% of the time the user is presented a movie card.

The browsing history 356 may include a web browsing history of the user. The web browsing history may include a list of web URLs 344 that the user visited. A web URL 344 in the user history record 352 may be associated with form data 358 that indicates information that the user selected and/or entered on the web page. Specifically, the form data 358 may indicate filtering parameters 338 that the user may have selected on the web page. The browsing history 356 may include an application browsing history. The application browsing history may indicate the native applications that the user used. Native applications refer to applications that may be installed at the mobile computing device 100. The browsing history 356 may include a list of ARIs 346 that identify particular application states that the mobile computing device 100 displayed in the past. An ARI 346 in the user history record 352 may also be associated with form data 358 that indicates filtering parameters 338 that the user selected and/or entered through the native application. The application browsing history may be referred to as an application usage history. The card server 300 may receive the browsing history 356 from the mobile computing device 100.

The search history 360 may include a list of search queries 122 that the card server 300 received from the user. When the card server 300 receives a card request 120, the card server 300 can retrieve the search query 122 from the card request 120 and store the search query 122 in the user history record 352. The card server 300 can utilize the search queries 122 in the search history 360 to select the filtering parameter 338.

The processing device 350 may include a collection of one or more computing processors that execute computer readable instructions. The computing processors of the processing device 350 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 350 may execute computer-readable instructions that correspond with a card record selector 352, a filtering parameter determiner 354, and/or a card object generator 356.

The card record selector 352 selects one or more card records 322 from the card data store 320 based on the search query 122. The card record selector 352 can select the card records 322 by comparing the search terms of the search query 122 with the data fields stored in the card records 322. The card record selector 352 can select a card record 322 based on a comparison between search terms in the search query 122, and the value 328 of the single-value data fields 328 or the values 336 of the multi-value data fields 330. Specifically, the card record selector 352 can select a card record 322, if the card record 322 includes all the search terms in the search query 122. In some implementations, the card data store 220 may include a data structure (e.g., a mapping mechanism such as an inverted index, a look-up table, etc.) that maps keywords to the record IDs 324. In such implementations, the card record selector 352 can query the data structure with the search terms of the search query 122. In return, the card record selector 352 can receive the card record ID(s) 324 for the card record(s) 322 that correspond with the search query 122.

In some implementations, the card record selector 352 may tokenize the search query 122 prior to selecting the card records 322 from the card data store 320. Tokenizing the search query 122 may refer to generating parsed tokens from the search terms of the search query 122. The card record selector 352 can use a tokenizer to tokenize the search query 122. The tokenizer can use various techniques to generate the tokens. In some examples, the tokenizer generates the tokens by splitting the characters of the search query 122 with a given delimiter (e.g., " "). The card server 300 can perform various other operations to the search query 122 prior to selecting the card records 322. For example, the card server 300 may perform stemming by reducing the words in the search query 122 to their stem word, or root word. The card server 300 can perform synonymization by identifying synonyms of search terms in the search query 122. The card server 300 may also perform stop word removal by removing commonly occurring words from the search query 122 (e.g., by removing "a", "and", etc.). The card server 300 can also identify misspelled words, and replace the misspelled words with the correct spelling. Some of the operations described herein may be referred to as 'cleaning' the search query 122.

In some implementations, the card record selector 352 can score the selected card records 322. Scoring the selected card record 322 may refer to generating a relevance score for the selected card record 322. The relevance score for the selected card record 322 may indicate how relevant the selected card record 322 is to the search query 122. The card record selector 352 can compute a set of scoring features for the selected card record 322, and determine a relevance score for the selected card record 322 based on the scoring features. The scoring features may include record scoring features, query scoring features, and/or record-query scoring features.

A record scoring feature may be associated with a card record 322. A record scoring feature may include data associated with an application state that corresponds with the card record 322. For example, a record scoring feature may include a value 328 from the one or more single-value data fields 326. A record scoring feature may include parameters related to the application state that corresponds with the card record 322. A record scoring feature may include data that indicates a popularity of the corresponding application state. For example, a record scoring feature may indicate a number of times that the card record 322 has been utilized to generate an application card 130 at a mobile computing device 100. A record scoring feature may indicate a rating of the corresponding application state (e.g., a number of stars associated with the application state). A record scoring feature may include a Boolean value that indicates whether the card record 322 includes a multi-value data field 330. A record scoring feature may include the number of multi-value data fields 330 in the card record 322. A record scoring feature may include a Boolean value that indicates whether the values 336 in a multi-value data field 330 are tagged with one or more filtering parameters 338. A record scoring feature may include the number of filtering parameters 338 associated with the values 336 of a multi-value data field 330.

A query scoring feature may be associated with the search query 122. A query scoring feature may include data associated with the search query 122. Example query scoring features may include a number of words in the search query 122, a popularity of the search query 122, and/or an expected frequency of the words in the search query 122. A record-query scoring feature may include data that may be generated based on data associated with the selected card record 322, and the search query 122. A record-query scoring feature may include parameters that indicate a number of matches between the terms of the search query 122, and the selected card record 322.

A record-query scoring feature may include data that may be generated based on data associated with the selected card record 322, and the search query 122. For example, the record-query scoring feature may include a Boolean value that indicates whether the search query 122 matches any of the values 336 in a multi-value data field 330. A record-query scoring feature may indicate the number of multi-value data fields 330 that include values 336 that match the search terms of the search query 122.

In some implementations, a record-query scoring may include data that may be generated based on information from the user history record 352 associated with the user ID 102 specified in the card request 120. For example, a record-query scoring feature may include a Boolean value that indicates whether the card record ID 324, or the card type 325 of the card record 322 is in the card history 354. Another record-query scoring feature may include a Boolean value that indicates whether the card history 354 indicates any of the filtering parameters 338 in the card record 322 have been previously selected. Another record-query scoring feature may indicate whether the browsing history 356 includes the access mechanism 342 stored in the card record 322. Specifically, a record-query scoring feature may include a Boolean value that indicates whether the form data 358 in the browsing history 358 refers to any of the filtering parameters 338 in the card record 322. Another record-query scoring feature may indicate whether the search queries 122 in the search history 360 match any of the filtering parameters 338 in the card record 322.

The card record selector 352 can score the card records 322 based on the scoring features. The card record selector 352 may include a machine learned model(s) (e.g., a supervised learning model). The machine learned model may be configured to receive the scoring features, and score the card records 322 based the scoring features. Specifically, the card record selector 352 may determine a feature vector that includes the record scoring feature(s), the query scoring feature(s), and/or the record-query scoring feature(s). The card record selector 352 may use the feature vector as an input for a machine-learned regression model to calculate a score for the card record 322. The machine-learned regression model may include a set of decision trees (e.g., gradient boosted decision trees). The machine-learned regression model may include a logistic probability formula. A machine learned task can be implemented as a semi-supervised learning task, where a portion of the training data is labeled with human-curated scores, and the remaining training data may be used without human-curated scores.

The filtering parameter determiner 354 determines a filtering parameter 338 for the values 336 in the multi-value data field 330. The filtering parameter determiner 354 can select a filtering parameter 338 from the set of filtering parameters 338 in the card record 322. The filtering parameter determiner 354 can select the filtering parameter 338 based on information stored in a user history record 352 associated with the card request 120. The filtering parameter determiner 354 can identify the user history record 352 that is associated with the card request 120, and utilize the information stored in the user history record 352 to select the filtering parameter 338.

The filtering parameter determiner 354 may identify the user history record 352 based on the information included in the card request 120. For example, the card request 120 may include the user ID 102. The filtering parameter determiner 354 can retrieve the user ID 102 from the card request 120. Upon retrieving the user ID 102 from the card request 120, the filtering parameter determiner 354 can identify the user history record 352 that corresponds with the user ID 102. For example, the user history data store 350 may include a data structure that maps user IDs 102 to user history record IDs that identify the user history records 352. The filtering parameter determiner 354 can query the data structure with the user ID 102 specified in the card request 120, and receive a user history record ID that identifies the user history record 352 that is associated with the user ID 102. The data structure may include a mapping mechanism such as an index (e.g., an inverted index), a look-up table, etc.

Upon identifying the user history record 352, the filtering parameter determiner 354 can utilize the information stored in the user history record 352 to select the filtering parameter 338. The filtering parameter determiner 354 can select the filtering parameter 338 based on the card history 354, the browsing history 356, and/or the search history 360 stored in the user history record 352. For example, the filtering parameter determiner 354 can determine whether the card history 354 includes the card record ID 324 or the card type 325 of the selected card record 322. The card history 354 may include the card record ID 324 of the selected card record 322, if the card server 300 previously utilized the selected card record 322 to render an application card 130 at the mobile computing device 100. For example, if the selected card record 322 corresponds with The Dark Knight movie, then the card history 354 may include the card record ID 324 for the selected card record 322 if the card server 300 previously served the mobile computing device 100 an application card 130 for The Dark Knight movie. Similarly, the card history 354 may include the card type 325, if the card server 300 previously served information from any card records 322 that have the same card type 325 as the selected card record 322. For example, if the card server 300 previously served a movie card to the mobile computing device 100, then the card history 354 may include movie card as a card type 325.

The filtering parameter determiner 354 can select the filtering parameter 338 based on previous filtering parameters 338p. The user may have selected the previous filtering parameters 338p when the user was presented information from the same card record 322 or another card record 322 of the same card type 325. In some implementations, the filtering parameter determiner 354 can select a filtering parameter 338, if the filtering parameter 338 was selected most recently. For example, if the last time the user viewed reviews chronologically, then the filtering parameter determiner 354 can select the "chrono" filtering parameter for the reviews. In some implementations, the filtering parameter determiner 354 can select a filtering parameter 338, if the filtering parameter 338 was selected most frequently. For example, if the user selected the "loved it" filtering parameter for more than 50% of the movie cards, then the filtering parameter determiner 354 can select the "loved it" filtering parameter for the reviews.

In some implementations, the filtering parameter determiner 354 may select the filtering parameter 338 based on the browsing history 356. As described herein, the selected card record 322 may include an access mechanism 342 (e.g., a web URL 344 or an ARI 346). The browsing history 356 may include a list of access mechanisms 342 that the user may have accessed in the past. For example, the browsing history 356 may include a list of web URLs 344 that the user visited, and/or a list of ARIs 346 that the user accessed. The browsing history 356 may also include form data 358 that indicates information that the user selected or entered into form fields that were displayed by the web pages indicated by the web URLs 344 or displayed by the application states indicated by the ARIs 346. Form fields may refer to graphical user interface (GUI) elements (e.g., drop-downs, text boxes check boxes, etc.) that are displayed by the web pages or the applications. Some of the form data 358 may indicate filtering parameters 338 that the user may have selected.

The filtering parameter determiner 354 can select the filtering parameter 338 based on the form data 358. For example, the filtering parameter determiner 354 may a filtering parameter 338 that the form data 358 indicates as having been selected the last time the user visited the web page or the application state. Alternatively, the filtering parameter determiner 354 may select a filtering parameter 338 that the form data 358 indicates as having been selected the most frequently by the user. In some implementations, the form data 358 may indicate that different filtering parameters 338 were selected during different times of the day. In such implementations, the filtering parameter determiner 354 can select the filtering parameter 338 that was selected most frequently during a time of day that corresponds with a current time. In some implementations, the form data 358 may indicate that different filtering parameters 338 were selected when the user was at different locations. In such implementations, the filtering parameter determiner 354 may select the filtering parameter 338 that was selected most frequently from a current location of the mobile computing device 100.

In some implementations, the filtering parameter determiner 354 may select the filtering parameter 338 based on the search history 360. The search history 360 may include the search queries 122 that the card server 300 received from the mobile computing device 100 in the past. The filtering parameter determiner 354 can select a filtering parameter 338 based on a comparison of the filtering parameters 338 with the search queries 122. In some implementations, the filtering parameter determiner 354 can select a filtering parameter 338 that matches the most number of search queries 122. In other words, the filtering parameter determiner 354 can select the filtering parameter 338 that was included most frequently among the search terms of the search queries 122.

The card object generator 356 generates the card object 370. The card object 370 includes information from the selected card record(s) 322. For example, the card object 370 may include the value 328 from the single-value data field(s) 326, and values 336 from the multi-value data field(s) 330 of the selected card record(s) 322. For each multi-value data field 330, the card object generator 356 may include the filtering parameter 338 that the filtering parameter determiner 354 selected for the values 336. The card object generator 356 can instantiate a data container that represents the card object 370. The data container may include a JSON (JavaScript Object Notation) object, an XML (Extensible Markup Language) file, etc. Upon instantiating the data container, the card object generator 356 can write the values 336 of a multi-value data field 330, and the filtering parameter 338 selected for the values 336 to the data container. Upon generating the card object 370, the card object generator 356 can transmit the card object 370 to the mobile computing device 100 via the network communication device 305.

In some implementations, the card server 300 may determine the filtering parameter 338 in response to receiving a request for an expanded view of the multi-value data field 330. In such implementations, the card object 370 transmitted in response to the card request 120 may include the collapsed-view descriptor 332 but not the filtering parameter 338. Subsequent to transmitting the card object 370, the card server 300 may receive a request for an expanded view of the multi-value data field 330. Upon receiving the request for the expanded view, the card server 300 can select the filtering parameter 338 and indicate the selected filtering parameter 338 to the mobile computing device 100.

Figure 4:
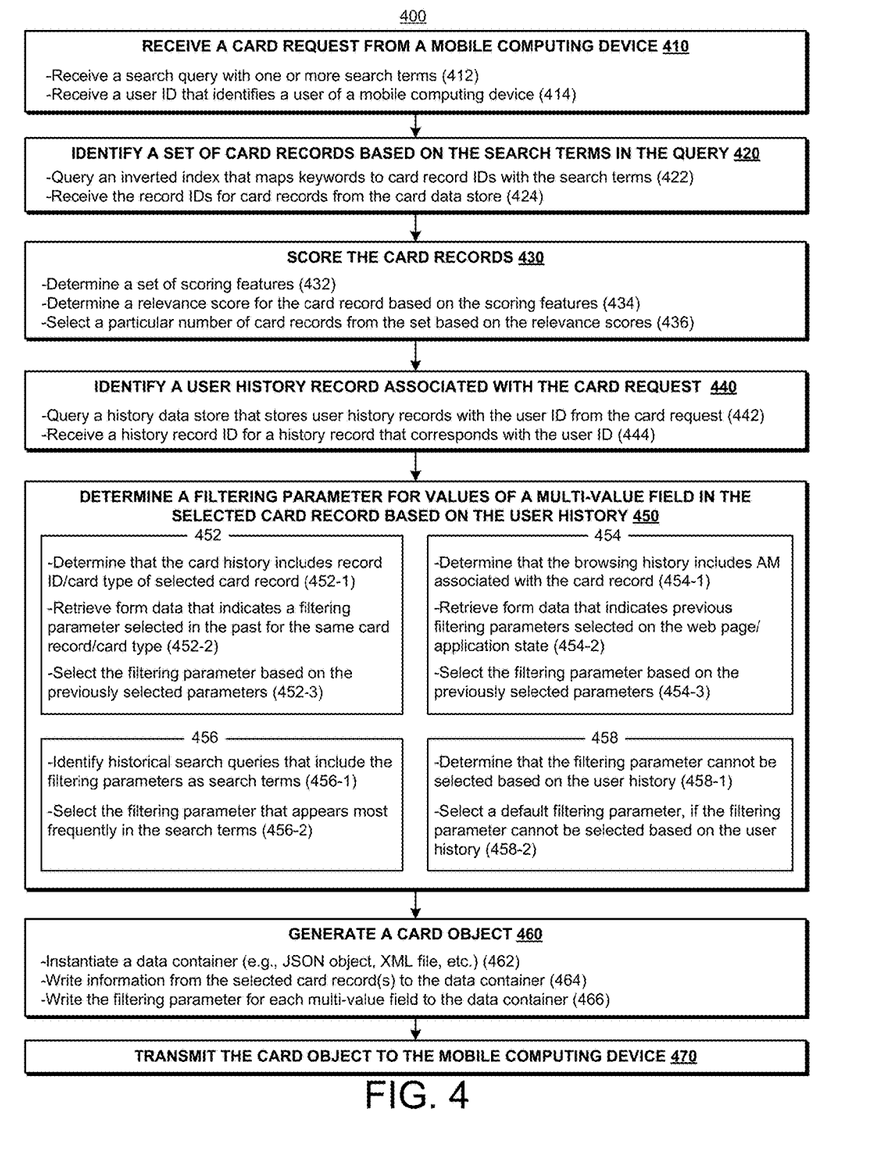
FIG. 4 is a block diagram of a method that the card server may execute to determine the filtering parameter for values in a multi-value data field based on a user history associated with the mobile computing device.

FIG. 4 illustrates a method 400 for determining a filtering parameter for values in a multi-value data field displayed in an application card. The method 400 can be implemented as a set of computer readable instructions that may be executed by a computing processor of a card server (e.g., the processing device 350 of the card server 300 shown in FIG. 3). Generally, the card server receives a card request from a mobile computing device (at 410). The card request includes a search query. At 420, the card server selects one or more card records from a card data store based on the search terms in the search query. The card server can score the selected card records (at 430). At 440, the card server identifies a user history record associated with the card request. At 450, the card server determines a filtering parameter for values in a multi-value data field of the selected card record based on the information in the user history record. At 460, the card server generates a card object that includes the values from the multi-value data field, and indicates the filtering parameter for the values. At 470, the card server transmits the card object to the mobile computing device.

At 410, the card server receives a card request from a mobile computing device. Receiving the card request may include receiving a search query with one or more search terms (at 412). The search query in the card request may be referred to as a current search query. Receiving the card request may also include receiving a user ID that identifies a user of the mobile computing device that initiated the card request (at 414). The user ID may include an email address, a user name, a mobile phone number, etc. The card request may include other information. For example, the card request may include contextual data such as sensor values (e.g., a location of the mobile computing device), application IDs that identify the applications that are installed at the mobile computing device, etc.

At 420, the card server selects a set of card records based on the search terms in the search query. The set may be referred to as a consideration set. The card server can select the card records by comparing the search terms with the information that is stored in the card records. For example, the card server can compare the search terms with the values of the data fields that are stored in the card record. If the search terms match the values of the data fields of a card record, then the card server can select the card record. Similarly, if a card record includes all of the search terms, or a majority of search terms (e.g., more than a threshold percentage) then the card server can select that particular card record. In some implementations, the card data store may include a data structure (e.g., a mapping mechanism) that maps keywords to card record IDs that identify the card records. The data structure may include an index (e.g., an inverted index), a lookup table, etc. The card server can query the data structure with the search terms of the current search query (at 422). Upon querying the data structure with the current search query, the card server can receive the record IDs for card records from the card data store (at 424). The record IDs that the card server receives identify card records that may be relevant to the current search query. In some implementations, the card server may tokenize the current search query, and/or clean the search query (as described in relation to FIG. 3).

At 430, the card server scores the selected card records. Scoring the selected card records may include determining a set of scoring features (at 432). As described herein, the scoring features may include one or more record scoring features, one or more query scoring features, and/or one or more record-query scoring features. Upon determining the scoring features, the card server can determine a relevance score for the card record based on the scoring features (at 434). As described herein, determining the relevance score may include utilizing a machine-learned model that receives the scoring features for a card record as an input, and outputs the relevance score for the card record. In some implementations, the card server may select a particular number of card records from the set based on the relevance scores of the card records in the set (at 436). For example, the card server may select one, two, or three of the card records with the highest relevance scores.

At 440, the card server identifies a user history record associated with the card request. The card server may include a user history data store that stores user history records (e.g., the user history data store 350 shown in FIG. 3). Each user history record may store a user history associated with a user. As described herein, the user history may include a card history, a browsing history, and/or a search history. A user history record may be associated with a user ID that identifies a user. The card server can retrieve the user ID from the card request. The card server can query the user history data store with the user ID retrieved from the card request (at 442). Querying the user history data store may include querying a data structure (e.g., a mapping mechanism such as an inverted index) that maps user IDs to user history record IDs that identify user history records. At 444, the card server can receive a user history record ID for a user history record that corresponds with user ID specified in the card request.

At 450, the card server determines a filtering parameter for the values of a multi-value field in the selected card record based on the user history record associated with the card request. In other words, the card server selects a filtering parameter based on a user history of the user who may be currently using the mobile computing device. The card server may select the filtering parameter based on a card history (at 452). Alternatively or additionally, the card server may select the filtering parameter based on a browsing history (at 454). Alternatively or additionally, the card server may select the filtering parameter based on a search history (at 456). If the card server is unable to select the filtering parameter based on the user history record, then the card server may select a default filtering parameter (at 458).

At 452, the card server may select the filtering parameter from a set of filtering parameters based on a card history indicated by the user history record. The card history may indicate specific card records that the card server utilized to serve application cards to the mobile computing device in the past. For example, the card history may indicate that the card server served an application card for The Dark Knight movie in the past. Additionally or alternatively, the card history may indicate card types that the card server served the mobile computing device in the past. For example, the card history can indicate that the card server served movie cards to the mobile computing device in the past. The card history may also indicate the filtering parameters that the user selected for application cards that the card server presented to the user in the past. For example, the card history may indicate a filtering parameter that the user selected for the reviews field in a movie card.

At 452-1, the card server may determine that the card history includes the card record ID for the selected card record, or the card type of the selected card record. The card server can retrieve form data that indicates a filtering parameter that the user may have selected for the selected card record, or the card type of the selected card record (at 452-2). At 452-3, the card server can select the filtering parameter based on the previously selected parameter(s). In some implementations, the card server may select the filtering parameter that was selected the last time the user was presented an application card of the same card type. For example, if the user selected the "chronological" filtering parameter for the reviews field in the last movie card that the user saw, then the card server may select the "chronological" filtering parameter. In some implementations, the card server may select a filtering parameter, if the filtering parameter was selected more than a threshold number of times. For example, the card server may select the "loved it" filtering parameter for the reviews field, if the user selected the "loved it" filtering parameter for more than 50% of the movie cards that the user was presented.

At 454, the card server may select a filtering parameter from a set of filtering parameters based on a browsing history indicated by the user history record. The browsing history may include a list of access mechanisms for resources that the user accessed in the past. For example, the access mechanisms may include web URLs that the user visited, and/or ARIs for application states that the user accessed. At 454-1, the card server can determine that the browsing history includes an access mechanism associated with the selected card record. In other words, the card server can determine that the user may have accessed a web page and/or an application state that is associated with the selected card record.

At 454-2, the card server retrieves form data that may indicate a filtering parameter that the user may have selected when the user visited the web page and/or the application state associated with the selected card record. At 454-3, the card server selects a filtering parameter from a set of filtering parameters based on the previously selected filtering parameter(s) indicated by the browsing history. In some implementations, the card server may select a filtering parameter that the user selected the last time the user visited the web page and/or the application state associated with the card record. For example, if the user selected the "chronological" filtering parameter for the reviews field in a movie application that displays movie information, then the card server may select the "chronological" filtering parameter. In some implementations, the card server may select a filtering parameter, if the filtering parameter was selected more than a threshold number of times. For example, the card server may select the "loved it" filtering parameter for the reviews field, if the user selected the "loved it" filtering parameter for more than 50% of movies that the user viewed in the application. An example of the movie application is the IMDB® application.

At 456, the card server selects a filtering parameter based on a search history. The search history may include search queries that the card server received from the mobile computing device in the past. Hence, the card server may select the filtering parameter based on search queries that the card server received from the user in the past. At 456-1, the card server can identify search queries that include the filtering parameters as search terms. At 456-2, the card server can select the filtering parameter that appears most frequently in the search terms of previous search queries. In some implementations, the card server may select a filtering parameter specified as a search term in a search query, if the same search query also specifies the data field as a search term. For example, if some of the search queries include "best reviews for . . . ", then the card server can select the "best" filtering parameter for the reviews field. In this example, the "best" refers to the "best" filtering parameter, and "reviews" refers to the reviews field.

At 458, the card server can select a default filtering parameter. The card server may determine the card server cannot select a filtering parameter based on the user history (at 458-1). For example, the card server may determine that the user history data store does not store a user history record that corresponds with the user ID specified in the card request. In other words, the card server may not have a user history for the user. If the card server is unable to select a filtering parameter based on the user history, then the card server can select a default filtering parameter (458-2). In some implementations, the default filtering parameter may be the filtering parameter that is selected most frequently by other users.

At 460, the card server generates a card object. Generating the card object may include instantiating a data container (at 462). The data container may include a JSON object, an XML file, etc. The card server can write information from the selected card record into the data container (at 464). The information may include a value from a single-value data field, and values from a multi-value data field. At 466, the card server writes the filtering parameter for the values in the multi-value data field into the data container. In some implementations, the card server may retrieve an access mechanism template from the selected card record, and parameterize the access mechanism template. Parameterizing the access mechanism template may include writing the selected filtering parameter into the access mechanism template. At 470, the card server transmits the card object to the mobile computing device. In some implementations, transmitting the card object may include transmitting the parameterized access mechanism template.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., LCD (liquid crystal display) monitor, or touch screen for displaying information to the user and optionally a keyboard and a pointing device, e.g., a mouse, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A card server configured to improve a display of a mobile computing device user interface, the card server comprising:
    a network communication device;
    a storage device, using non-transitory computer readable storage, that stores:
        a user history data store that stores user history records, each user history record being associated with a user identifier (ID), each user history record comprises a browsing history and/or a search history; and
        a card data store that stores application card records, each application card record comprises one or more multi-value data fields, each multi-value data field comprises:
            a text string that represents a collapsed-view descriptor; and
            expanded-view information that comprises a plurality of values, and a plurality of filtering parameters for filtering the values; and
    at least one computer processor that executes computer-readable instructions that, when executed by the at least one computer processor, cause the at least one computer processor to:
        receive, using the network communication device, a card request from a mobile computing device, the card request comprises a search query with one or more search terms, and a user ID;
        identify a set of application card records from the card data store based on the search terms in the search query;
        determine a relevance score for each application card record in the set of application card records, the relevance score for a card record indicates the relevance of the card record to the search query;
        select an application card record from the set of application card records based on the relevance scores of the application card records;
        identify a user history record associated with the card request based on the user ID specified in the card request;
        for each multi-value field in the selected application card record, select a current filtering parameter from the plurality of filtering parameters based on the browsing history and/or the search history indicated by the user history record associated with the card request;
        generate a card object that comprises the one or more multi-value data fields from the selected application card record, and indicates the selected filtering parameter for the values in the multi-value data field; and
        transmit, using the network communication device, the card object to the mobile computing device,
        wherein each value from the plurality of values is associated with one or more of the filtering parameters such that only values that are associated with the selected filtering parameter are displayed at the mobile computing device.

2. The card server of claim 1, wherein the browsing history comprises a list of web uniform resource locators (URLs) for web pages, and form data that indicates previous filtering parameters selected on the web pages; and wherein selecting the filtering parameter comprises:
    determining that the list of web URLs includes a web URL for a web page associated with the selected application card record;
    retrieving the previous filtering parameters selected on the web page associated with the selected application card record; and
    selecting the current filtering parameter based on the previous filtering parameters.

3. The card server of claim 1, wherein the browsing history comprises a list of application resource identifiers (ARIs) that identify application states, and form data that indicates previous filtering parameters selected in the application states; and wherein selecting the filtering parameter comprises:
    determining that the list of ARIs includes an ARI for an application state associated with the selected application card record;
    retrieving the previous filtering parameters selected through the application state associated with the selected application card record; and
    selecting the current filtering parameter based on the previous filtering parameters.

4. The card server of claim 1, wherein the search history comprises a list of search queries that the card server previously received from the mobile computing device; and wherein selecting the filtering parameter comprises:
    identifying previous search queries from the mobile computing device that include the filtering parameters as search terms; and selecting the filtering parameter that appears most frequently in the previous search queries.

5. The card server of claim 1, wherein each user history record comprises a card record history that includes a list of card record identifiers (IDs) for application card records that have been utilized to render application cards at the mobile computing device, and form data that indicates previous filtering parameters selected via a previous application card; and wherein selecting the filtering parameter comprises:
   determining that the list of card record IDs includes a card record ID for the selected application card record;
   retrieving the previous filtering parameters selected through the previous application card rendered based on the selected application card record; and
   selecting the current filtering parameter based on the previous filtering parameters.

6. The card server of claim 1, wherein each application card record is associated with a card record ID that identifies the application card record, and wherein identifying the set of application card records comprises:
   querying a data structure associated with the card data store, which maps keywords to the card record IDs, with the search terms of the search query; and
   receiving the card record IDs for the application card records that correspond with the search terms.

7. The card server of claim 1, wherein determining the relevance score for each application card record comprises:
   computing a set of scoring features for the application card record; and
   determining the relevance score for the application card record based on the scoring features, and a machine-learned model.

8. The card server of claim 1, wherein selecting the application card record from the set of application card records comprises selecting the application card record with the highest relevance score.

9. The card server of claim 1, wherein identifying the user history record associated with the card request comprises:
   querying an inverted index associated with the user history data store with the user ID specified in the card request; and
   receiving the user history record associated with the user ID in response to querying the inverted index.

10. The card server of claim 1, wherein the expanded-view information further comprises a uniform resource locator (URL) template; and wherein selecting the current filtering parameter comprises parameterizing the URL template with the current filtering parameter.

11. A computer-implemented method for providing a card object for rendering an application card and for improving a display of a mobile computing device user interface, the computer-implemented method comprising:
   storing, at a storage device of a card server, a user history data store that stores user history records, each user history record being associated with a user identifier (ID), each user history record comprises a browsing history and/or a search history;
   storing, at the storage device, a card data store that stores application card records, each application card record comprises one or more multi-value data fields, each multi-value data field comprises:
      a text string that represents a collapsed-view descriptor; and
      expanded-view information that comprises a plurality of values, and a plurality of filtering parameters for filtering the values;
   receiving, via a network communication device of the card server, a card request from a mobile computing device, the card request comprises a search query with one or more search terms, and a user ID;
   identifying, at a at least one computer processor of the card server, a set of application card records from the card data store based on the search terms in the search query;
   determining, at the at least one computer processor, a relevance score for each application card record in the set of application card records, the relevance score for an application card record indicates the relevance of the application card record to the search query;
   selecting, by the at least one computer processor, a card record from the set of application card records based on the relevance scores of the application card records;
   identifying, by the at least one computer processor, a user history record associated with the card request based on the user ID specified in the card request;
   for each multi-value field in the selected application card record, selecting a current filtering parameter from the plurality of filtering parameters based on the browsing history and/or the search history indicated by the user history record associated with the card request;
   generating, by the at least one computer processor, a card object that comprises the one or more multi-value data fields from the selected application card record, and indicates the selected filtering parameter for the values in the multi-value data field; and
   transmitting, via the network communication device, the card object to the mobile computing device,
   wherein each value from the plurality of values is associated with one or more of the filtering parameters such that only values that are associated with the selected filtering parameter are displayed at the mobile computing device.

12. The computer-implemented method of claim 11, wherein the browsing history comprises a list of web uniform resource locators (URLs) for web pages, and form data that indicates previous filtering parameters selected on the web pages; and wherein selecting the filtering parameter comprises:
   determining that the list of web URLs includes a web URL for a web page associated with the selected application card record;
   retrieving the previous filtering parameters selected on the web page associated with the selected application card record; and
   selecting the current filtering parameter based on the previous filtering parameters.

13. The computer-implemented method of claim 11, wherein the browsing history comprises a list of application resource identifiers (ARIs) that identify application states, and form data that indicates previous filtering parameters selected in the application states; and wherein selecting the filtering parameter comprises:
   determining that the list of ARIs includes an ARI for an application state associated with the selected application card record;
   retrieving the previous filtering parameters selected through the application state associated with the selected application card record; and
   selecting the current filtering parameter based on the previous filtering parameters.

14. The computer-implemented method of claim 11, wherein the search history comprises a list of search queries that the card server previously received from the mobile computing device; and wherein selecting the filtering parameter comprises:
  identifying previous search queries from the mobile computing device that include the filtering parameters as search terms; and
  selecting the filtering parameter that appears most frequently in the previous search queries.

15. A computer program product configured to improve a display of a mobile computing device user interface, the computer program product encoded on a non-transitory computer readable storage medium comprising instructions that when executed by a at least one computer processor, of a card server, cause the at least one computer processor to perform operations comprising:
  receiving, via a network communication device of the card server, a card request from a mobile computing device, the card request comprises a search query with one or more search terms, and a user ID;
  identifying, at the at least one computer processor of the card server, a set of application card records from a card data store based on the search terms in the search query;
  determining, at the at least one computer processor, a relevance score for each application card record in the set of application card records, the relevance score for an application card record indicates the relevance of the application card record to the search query;
  selecting, by the at least one computer processor, an application card record from the set of card records based on the relevance scores of the card records;
  identifying, by the processing device at least one computer processor, a user history record associated with the card request based on the user ID specified in the card request, the user history record indicating a browsing history and/or a search history for a user identified by the user ID;
  for each multi-value field in the selected application card record, selecting a current filtering parameter from the plurality of filtering parameters based on the browsing history and/or the search history indicated by the user history record associated with the card request;
  generating, by the at least one computer processor, a card object that comprises the one or more multi-value data fields from the selected application card record, and indicates the selected filtering parameter for the values in the multi-value data field; and
  transmitting, via the network communication device, the card object to the mobile computing device,
  wherein each value from the plurality of values is associated with one or more of the filtering parameters such that only values that are associated with the selected filtering parameter are displayed at the mobile computing device.

16. The computer program product of claim 15, wherein the browsing history comprises a list of web uniform resource locators (URLs) for web pages, and form data that indicates previous filtering parameters selected on the web pages; and wherein selecting the filtering parameter comprises:
  determining that the list of web URLs includes a web URL for a web page associated with the selected application card record;
  retrieving the previous filtering parameters selected on the web page associated with the selected application card record; and
  selecting the current filtering parameter based on the previous filtering parameters.

17. The computer program product of claim 15, wherein the browsing history comprises a list of application resource identifiers (ARIs) that identify application states, and form data that indicates previous filtering parameters selected in the application states; and wherein selecting the filtering parameter comprises:
  determining that the list of ARIs includes an ARI for an application state associated with the selected application card record;
  retrieving the previous filtering parameters selected through the application state associated with the selected application card record; and
  selecting the current filtering parameter based on the previous filtering parameters.

18. The computer program product of claim 15, wherein the search history comprises a list of search queries that the card server previously received from the mobile computing device; and wherein selecting the filtering parameter comprises:
  identifying previous search queries from the mobile computing device that include the filtering parameters as search terms; and
  selecting the filtering parameter that appears most frequently in the previous search queries.

19. The computer program product of claim 15, wherein each user history record comprises a card record history that includes a list of card record identifiers (IDs) for application card records that have been utilized to render application cards at the mobile computing device, and form data that indicates previous filtering parameters selected via a previous application card; and wherein selecting the filtering parameter comprises:
  determining that the list of card record IDs includes a card record ID for the selected application card record;
  retrieving the previous filtering parameters selected through the previous application card rendered based on the selected application card record; and
  selecting the current filtering parameter based on the previous filtering parameters.

* * * * *